Figure 1:
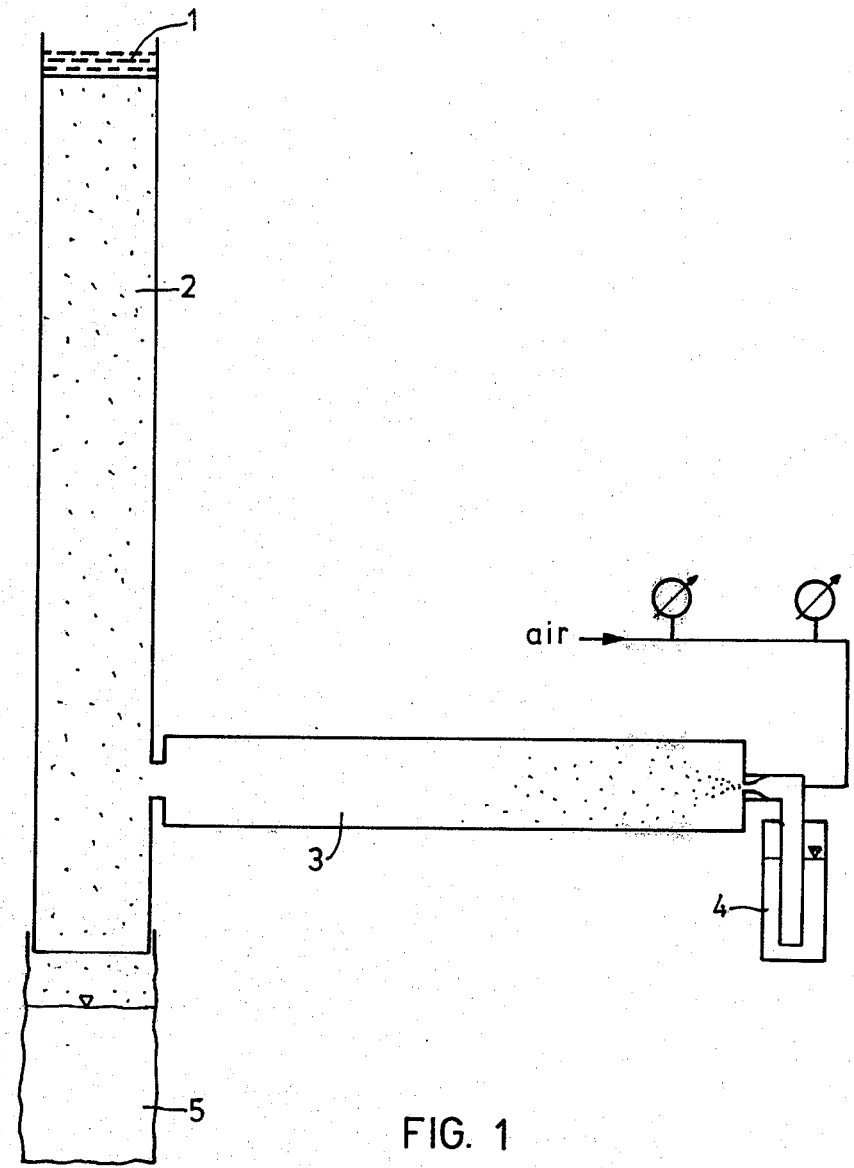

United States Patent [19]

Lahrs et al.

[11] 4,344,766
[45] Aug. 17, 1982

[54] PROCESS FOR THE MANUFACTURE OF PREPARATIONS WITH A LOW DUST CONTENT

[75] Inventors: Jurgen Lahrs; Klaus Schubert, both of Cologne; Claus Gosling, Leverkusen; Dorde Jovcic, Leichlingen; Harald Gleinig, Odenthal; Reiner Skerhut, Cologne, all of Fed. Rep. of Germany

[73] Assignee: Bayer Aktiengesellschaft, Leverkusen, Fed. Rep. of Germany

[21] Appl. No.: 255,933

[22] Filed: Apr. 20, 1981

[30] Foreign Application Priority Data

May 10, 1980 [DE] Fed. Rep. of Germany ....... 3018029

[51] Int. Cl.³ .......................... C09B 67/08; B32B 7/02
[52] U.S. Cl. ........................................ 8/524; 427/212
[58] Field of Search .......................... 8/524; 427/212

[56] References Cited

U.S. PATENT DOCUMENTS 3,703,404 11/1972 Kirk ................................... 427/212
4,134,725 1/1979 Buchel et al. ..................... 427/212

FOREIGN PATENT DOCUMENTS 683065 11/1952 United Kingdom .................... 8/524
713541 8/1954 United Kingdom .................... 8/524
1368322 9/1974 United Kingdom .................... 8/524

Primary Examiner—Maria Parrish Tungol
Attorney, Agent, or Firm—Sprung, Horn, Kramer & Woods

[57] ABSTRACT

Pulverulent preparations with a low dust content, in particular dyestuff powders, are obtained when the customary dustproofing agents are not added before the drying process and also are not sprayed directly onto the product to be dustproofed, but are allowed to act on the pulverulent product in the form of an aerosol.

The average particle size of the aerosol is less than 10μ.

3 Claims, 1 Drawing Figure

PROCESS FOR THE MANUFACTURE OF PREPARATIONS WITH A LOW DUST CONTENT

The invention relates to a process for the manufacture of pulverulent or granular preparations which have a low dust content or are non-dusting, for example dyestuff preparations.

An unpleasant formation of dust very frequently occurs during processing of pulverulent or granular substances. In order to eliminate this troublesome effect, dustproofing agents are frequently added to the powders or granules. This is effected, for example, either by spraying directly onto the pulverulent product, for example in a centrifugal mixer (compare DOS (German Published Specification) 1,816,984), or by admixing these auxiliaries with the aqueous solution or dispersion of the product to be powdered, before the actual drying process (compare, for example, DOS (German Published Specification) 2,654,408).

However, the known methods of dustproofing have various disadvantages.

Thus, for example, in the case of direct spraying, agglomerations of the product arise because of the larger drops of liquid which are always present in the spray mist, and, during further processing or direct use of the pulverulent preparations, these agglomerations lead to undesired effects (for example "nest formation" when dyestuff powders are used for printing) or to caking on the walls of the apparatuses or vessels.

On the other hand, when the dustproofing agents are admixed with aqueous product slurries, creaming of these auxiliaries is observed, especially when the preparations are stored for relatively long periods, and the auxiliaries then settle on the walls and lids of the storage containers and are thus prevented from performing their actual function in the pulverulent preparation. A particular disadvantage of this procedure is that a relatively large amount of these agents, which are uniformly distributed in the product (that is to say also inside the product), is used, whilst only the proportion of these auxiliaries which is on the surface can be effective. This undesired effect can indeed largely be avoided by the process according to European Patent Application No. 0,015,464, but in this case also relatively large amount of the auxiliaries added are still required.

It has now been found that the disadvantages mentioned can be largely avoided if the dustproofing agents are not added before the drying process and also are not sprayed directly onto the product to be dustproofed, but are allowed to act on the pulverulent product in the form of an aerosol.

The average particle size of the aerosol should be less than 10μ.

The aerosols are prepared in a manner which is in itself known (compare, for example, DOS (German Published Specification) 1,571,773), by a procedure in which the dustproofing agent, optionally dissolved or dispersed in a solvent, is converted into a spray, or atomised ultrasonically and the larger drops of liquid thereby formed are then removed by centrifuging (for example in a cyclone), filtering through suitable filters or simply by utilising the force of gravity in a separating chamber.

The aerosols to be used according to the invention thus differ, from a purely qualitative point of view, from the spray mists hitherto used by the fact that virtually all the droplets of liquid do not fall as a result of the force of gravity.

Since, in the same volume, the aerosols have a considerable larger surface area than the conventional spray mists with larger particle diameters, their degree of effectiveness is also considerably improved, which is another advantage of the process according to the invention.

It is not necessary for particular requirements with regard to apparatus to be met for carrying out the new process. It is only important that the product to be dustproofed is wetted to a sufficient extent. In general, contact times of 1 second to 10 minutes are sufficient for 100 parts of power. In other respects, the contact times and the amount of aerosol to be employed depend, of course, on the nature of the product to be dustproofed, the effectiveness of the dustproofing agents and the design of the drying unit in which the pulverulent material is obtained.

The amount of dustproofing agents can therefore vary within relatively wide limits. On average, the material to be dustproofed is coated with 0.01–4%, preferably 0.1–1%, of dustproofing agent.

Suitable dustproofing agents are commercially available products, the composition of which depends on the nature of the material to be dustproofed.

The following classes of substances can be used, for example, for the dyestuff powders, which are preferably to be dustproofed: cyclic hydrocarbons, such as decalin and tetralin, phthalic acid dialkyl esters and, in particular, mineral oils, which can be partly sulphonated, with a boiling range from 130° to 300° C., or mixtures of these substances with, preferably, nonionic emulsifiers.

When carrying out the process in practice, a procedure is followed in which, for example, the pulverulent product obtained at the bottom of a spray-drier is introduced, via a vibrating screen (1) (compare FIG. 1) into a vertical dustproofing chamber (2) and the aerosol produced in the aerosol chamber (3) by means of the nozzle (4) is introduced into the path of the free-falling powder. The product obtained at the bottom of the dustproofing chamber (5) is virtually dustless and can be despatched or further processed immediately.

It is, of course, also possible for the aerosols to be used according to the invention to be introduced into other drying devices, for example in a paddle drier or directly into the bottom of an atomising drier, in which case, if products with which there is a danger of dust explosions and combustible products are dried, it must of course be ensured that the system is rendered inert by gases with a low oxygen content, pure nitrogen or noble gases.

In principle, the new process is suitable for dustproofing all products which tend to dust, such as, for example, washing powders, agents for combating pests, foodstuffs (for example milk powder, coffee powder and flour) and, in particular, pigments and dyestuffs. In the treatment of foodstuffs, it is, of course, necessary to use special, physiologically acceptable dustbinding agents.

The new process may be illustrated in more detail with the aid of the following examples.

In the context of this invention, by "percentages" there are to be understood percentages by weight.

EXAMPLE 1

Acid Black 172 powder which has been produced in a spray-drier and has a dust value of 34+4 and particle sizes of between 50 and 150μ is discharged continuously onto the vibrating screen according to FIG. 1, from where it falls into the dustproofing chamber, through which an aerosol of a commercially available dustproofing agent based on mineral oil flows. The stream of aerosol is metered so that the product leaving the dustproofing chamber is charged with about 0.25% dustproofing agent. The product obtained has a dust value of 0.

In contrast, only a dust value of 10+0 is obtained in the conventional procedure of direct spraying with 5 to 10 times the amount of dustproofing agent.

The abovementioned dust values were determined with the aid of the Cassella dust-measuring unit (compare Textilveredlung 9 (1974), page 102).

EXAMPLE 2

ACID Black 60 granules which have been produced in a spray-drier and have a dust value of 7+10 and an average particle size of 10μ are coated with 0.15% of dust-binding agent as in Example 1.

The granules obtained have a dust value of 0.

EXAMPLE 3

VAT Yellow 12 (65 405) granules which have been produced in a spray-drier and have a dust value of 8+0 and an average particle size of 180μ are dustproofed with an aerosol of a commercially available dustproofing agent based, for example, on mineral oil, as in Example 1. The stream of aerosol is metered in so that the product leaving the dustproofing chamber is charged with 0.2% of dustproofing agent. The product obtained, which is still free-flowing, has a dust value of 0.

EXAMPLE 4

Vulkacit CZ/MG granules which have been dried in a disc drier and have a dust value of 8+0 and an average particle size of 50μ are dustproofed with an aerosol of a paraffin oil, as in Example 1. The stream of aerosol is metered in so that the product leaving the dustproofing chamber is charged with 0.8% of dustproofing agent. The product obtained, which is still free-flowing, has a dust value of 2+0.

We claim:

1. In a process for the manufacture of pulverulent or granular preparations having a low dust content, by spraying the preparation with a dustproofing agent, the improvement comprising:

adjusting the dustproofing agent spray to an average particle size of less than 10 microns and applying said agent in an amount of 0.01 to 4%.

2. The process of claim 1 wherein said agent is applied in an amount of 0.1 to 1%.

3. The process of claim 1 or 2 wherein the preparations to be processed are dyestuff powders or granules.

* * * * *